United States Patent [19]
Rosen

[11] Patent Number: 5,056,854
[45] Date of Patent: Oct. 15, 1991

[54] SUN VISOR SYSTEM

[76] Inventor: John B. Rosen, 2330 W. 27th, Eugene, Oreg. 97405

[21] Appl. No.: 694,919

[22] Filed: May 2, 1991

[51] Int. Cl.⁵ .............................................. B60J 3/02
[52] U.S. Cl. ............................ 296/97.11; 248/251; 244/1 R
[58] Field of Search .......................... 296/97.11, 97.8; 248/251; 244/1 R

[56] References Cited

U.S. PATENT DOCUMENTS

| | | | |
|---|---|---|---|
| 1,437,656 | 12/1922 | Hein | 296/97.8 |
| 1,441,487 | 1/1923 | Doner | 296/97.8 |
| 1,442,255 | 1/1923 | Doner | 296/97.8 |
| 1,795,184 | 3/1931 | Smith | 296/97.11 |
| 1,814,500 | 7/1931 | Summerbell | 296/97.11 |
| 1,888,703 | 11/1932 | Summerbell | 296/97.11 |
| 1,941,032 | 12/1933 | Knowles | 296/97.11 |
| 2,829,920 | 4/1958 | Cohen | 296/97.7 |
| 2,869,922 | 1/1959 | Chester | 296/97.11 |
| 2,932,539 | 4/1960 | Galbraith | 296/97.11 |
| 2,978,274 | 4/1961 | Ordman | 296/97.11 |
| 3,122,393 | 2/1964 | Moody | 296/97.11 |
| 3,403,937 | 10/1968 | Quaine | 296/97.11 |

OTHER PUBLICATIONS

"Rosen Sunvisors" product description (two-sided, single sheet product brochures), published in 1988 by Rosen Product Develop.

Primary Examiner—Robert R. Song
Attorney, Agent, or Firm—Kolisch, Hartwell, Dickinson, McCormack & Heuser

[57] ABSTRACT

A sun visor system for use in the controlled manipulation of a sun visor on a transportation device to shield or filter light from an occupant of the vehicle. The visor system includes a rail structure having a pair of rail segments with operatively confronting segment ends defining a space therebetween. A gate structure is operatively associated with the rail segments, is configurable in the space between the rail segments in a closed condition, and is actuable to an open condition permitting removal of the sun visor by moving the same past one of the segment ends.

13 Claims, 2 Drawing Sheets

SUN VISOR SYSTEM

BACKGROUND AND SUMMARY OF THE INVENTION

This invention relates generally to visor systems which employ controllably manipulable visors to shield or filter light within transportation devices. More particularly, the invention relates to a visor system including a path-definer along which a visor is positionable, the visor being removable and redeployable using a gate structure forming a portion of the path-definer.

Although the proposed visor system is useful on any transportation device, it is particularly suited for use on aircraft. Several of the benefits of using the system address problems commonly encountered in the field of aviation. The invented visor system is therefore described in the context of an aircraft cockpit.

In the field of aviation, pilots often depend heavily on their vision in successfully directing an aircraft to its destination. Toward this end, pilots rely on their perceptions of an aircraft's instrumentation and their perceptions of the surroundings visible through the cockpit windows. As a result of light entering the cockpit through windows, however, pilots may experience difficulty reading an aircraft's instrumentation. This problem may arise due to glare or to uneven distribution of incoming light. Pilots may also have difficulty in clearly viewing the surroundings, glare from the windows being the principal reason. Sun visor systems have therefore been introduced into aircraft cockpits in an attempt to improve a pilot's sight.

Sunlight shining directly into an aircraft's cockpit is another problem pilots often experience. Because bright sunlight may distract a pilot, it is desirable for a pilot to have the ability to filter or shield himself or herself from such light. Where, as is the case in aviation, there is three-dimensional movement, the sun may enter the aircraft from a variety of directions. It is therefore desirable for a sun visor system to be employed which is characterized by a high degree of visor mobility. It is also desirable for visor systems to be easily adjustable to meet the particular needs of individuals, with a visor being easily manipulated.

Although visor systems are presently available for use in aircraft, known systems do not provide pilots with the ability to replace a visor easily and safely. It may, however, be necessary to remove or deploy a visor, even during flight. If a visor is damaged, it may be necessary to immediately replace the visor. Changing weather conditions may also necessitate replacement of a visor as the pilot's needs change. In addition, airline regulations may require frequent visor replacement. In presently available visor systems, visors are often removable only by partial or complete disassembly of the visor. Such a procedure may be complicated, making it impractical to replace a visor while piloting the aircraft. The amount of time necessary to accomplish replacement may add to the impracticality of performing the task. The confined nature of the cockpit may further complicate removal and deployment procedures.

Accordingly, it is an object of the present invention to provide a visor system allowing for the simple removal and deployment of a visor.

It is also an object of the invention to provide a visor system wherein a visor is controllably manipulable to shield or filter light in a variety of positions.

These and other objects and advantages of the present invention will be more clearly understood from a consideration of the accompanying drawings and the detailed description of the preferred embodiment.

DETAILED DESCRIPTION OF A PREFERRED EMBODIMENT

The present invention relates to a visor system wherein a visor is controllably manipulated to shield or filter light. As stated above, the invented system is suitable for use on any transportation device, but is described herein in the setting of the cockpit of an aircraft—an environment wherein it has been shown to offer particular utility.

Figure 1:
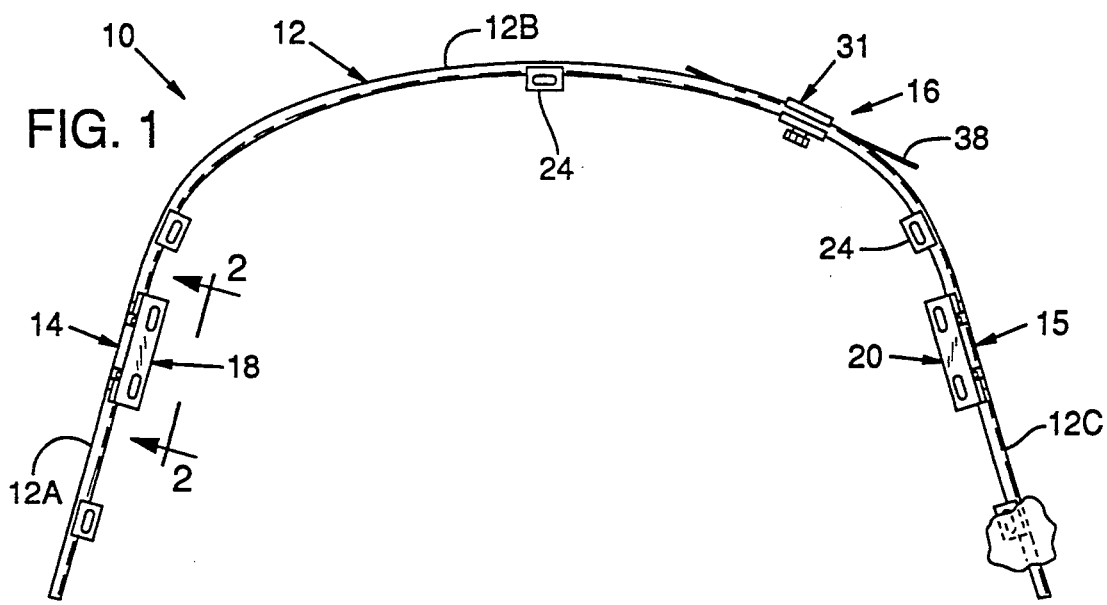
FIG. 1 is a top plan view of a preferred embodiment of the invented sun visor system installed for use in the cockpit of an aircraft.

Referring first to FIG. 1, a preferred embodiment of the proposed sun visor system has been depicted, the system being indicated generally at 10. As shown, system 10 includes a rail structure 12, a pair of gate structures 14, 15, and a single sun visor 16. In order to simplify the drawings, only a single visor is shown though it is appreciated that two or more may typically be used. The gate structures are operatively associated with the rail structure, and cooperate therewith to provide what is referred to herein as a path-definer. As will be explained, the gate structures are selectively openable and closable relative to the rail structure. In a closed condition, each gate structure permits free bidirectional sliding passage of a visor for ordinary translational positioning of the same. In an open condition, simple and convenient removal/installation of a visor is possible without the prior art attendant difficulties involved with partial or near total disassembly.

In the embodiment now being described, rail structure 12 is made up of three rail segments indicated at 12A, 12B, 12C distributed as shown in FIG. 1. Segments 12A, 12C are substantially straight-linear, and segment 12B is curvilinear.

Figure 2:
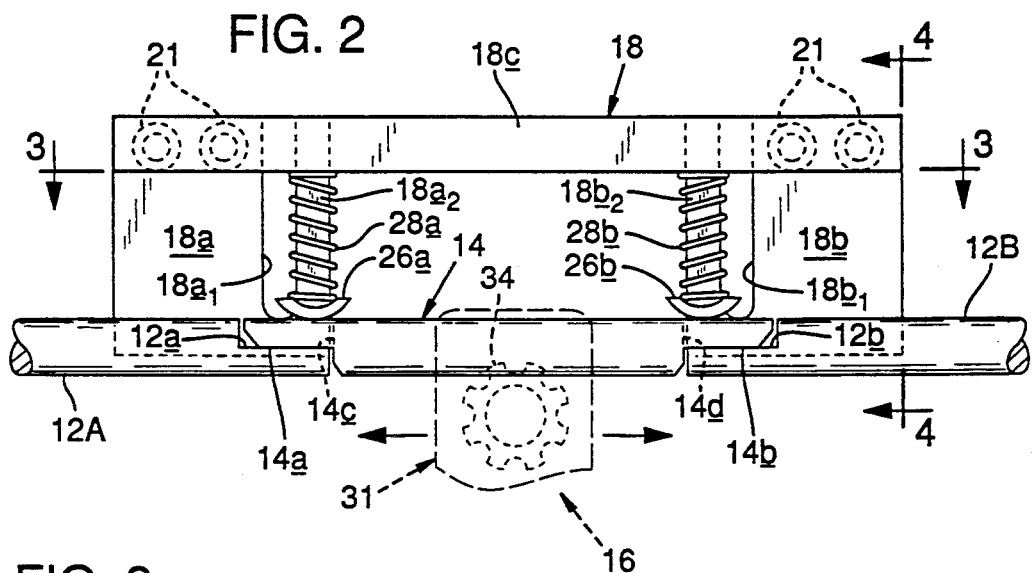
FIG. 2 an enlarged-scale fragmentary view taken generally along line 2—2 in FIG. 1, illustrating details of a gate structure employed in the system of FIG. 1, with this gate structure being depicted in a closed condition, and with a fragment of a visor shown in dashed lines.
Figure 3:
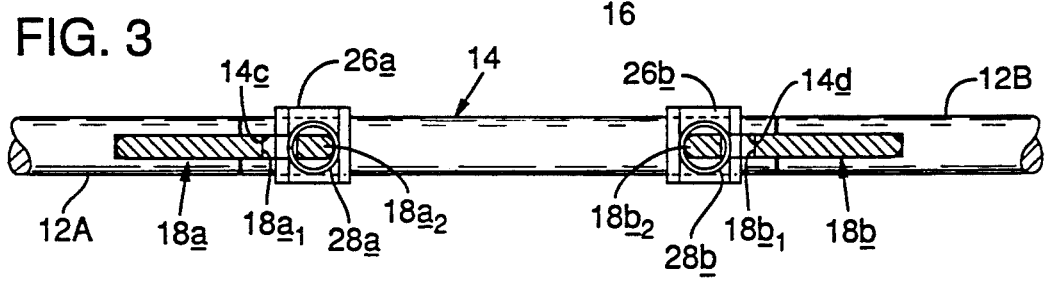
FIG. 3 is a sectional view taken generally along line 3—3 in FIG. 2.

Referring now to FIGS. 2 and 3 along with FIG. 1, and further discussing the make-up of the rail structure, one will notice that confronting ends of segments 12A, 12B are spaced from one another, with each of these ends including an upwardly facing relieved shoulder (or shoulder region) such as shoulder 12*a* on the end of rail segment 12A, and shoulder 12*b* on the confronting end of segment 12B. A similar spacing and shoulder characteristic exists in the vicinity of gate structure 15.

Still referring to FIGS. 2 and 3 along with FIG. 1, interconnecting and bridging the rail segments herein in the vicinities of the gate structures, are bridging structures such as the one shown at 18 which is located in the vicinity of gate structure 14. A similar bridging structure 20 is seen in FIG. 1 in the vicinity of gate structure 15. As will be explained, these bridging structures cooperate in system 10 both for mounting of the same in place and for providing a reaction member for biasing mechanism which is employed in connection with operation of the gate structures.

Considering the construction of bridging structure 18, the same includes a pair of upright vanes, or plates, 18a, 18b which are substantially co-planar, with plate 18a joined in a suitable keyway, or recess, (shown in dashed lines) formed on the upper side of the "confronting end" of rail segment 12A, and with plate 18b similarly joined, in mirror-image fashion, in a similar keyway, or recess, formed on the upper side of the "confronting end" of rail segment 12B shown in FIGS. 2 and 3. Plates 18a, 18b are also referred to herein as alignment members.

Figure 5:
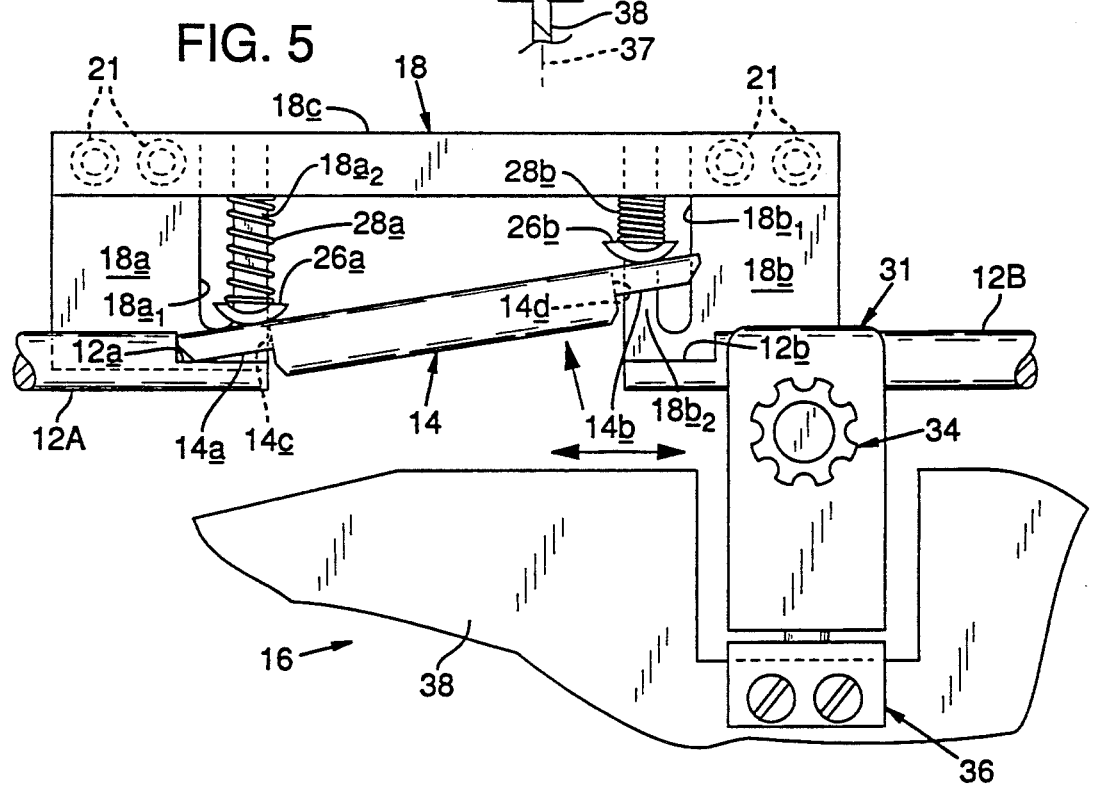
FIG. 5 is a view similar to that presented in FIG. 2 illustrating the gate structure of FIG. 2 in an open condition, with a solid-outline fragment of a visor shown in a position adjacent the gate structure.

Looking at the views of plates 18a, 18b presented in FIGS. 2, 3, and also in FIG. 5, these plates are provided with downwardly extending notches $18a_1$, $18b_1$, respectively, adjacent the ends of the plates which face the space between the confronting rail segments. As a consequence, each of these plates includes an upwardly projecting guide post, such as post $18a_2$ in plate 18a, and post $18b_2$ in plate 18b. The purposes for these posts will become apparent shortly.

Figure 4:
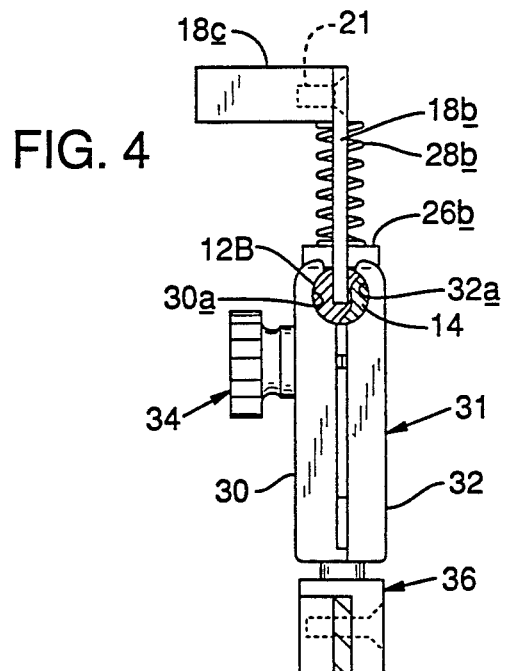
FIG. 4 is a sectional view taken generally along line 4—4 in FIG. 2.

Bringing FIG. 4 into the discussion now along with FIGS. 1, 2 and 3, spanning the space between the upper ends of plates 18a, 18b is a spanner bar 18c which is joined as by screws, such as those shown at 21 to those sides of the upper ends of plates 18a, 18b which face the inside of the space generally encompassed by the arced outline of the rail structure. Spanner bar 18c is provided with through-slots, such as slot 22, (see particularly FIG. 1). Bridging structure 20 is substantially similar in construction. Within the bridging structures, the spanner bars act as the "reaction members" mentioned earlier.

Continuing with a description of other structure that is unified with the rail structure, and referring expressly to FIG. 1, suitably joined to the rail segments, and distributed along the length of the rail structure, are slotted mounting brackets, such as those shown at 24. Five such brackets are illustrated in FIG. 1. The rail structure is mounted overhead the windows in an aircraft cockpit (for example) through suitable screws, or bolts, which are employed with the spanner plates in the bridging structures and with the slotted mounting brackets just mentioned.

Discussing some more qualities and characteristics of the rail structure illustrated herein, each rail segment takes the form of an elongate cylindrical bar of uniform cross section along its length. Such a construction has been chosen in order to offer a visor system which is compatible with conventional, commercially available visors which are configured with a clamping structure designed to grip opposing surfaces of a cylindrical support bar. One should recognize, however, that different kinds of rail segment cross sections could be employed to accommodate visor-carried mounting structure which is somewhat differently configured. Such is simply a matter of designer choice, and in no way affects the central scope and content of the present invention.

Digressing for a moment to discuss the conventional construction of visor 16 illustrated herein, and referring to FIGS. 1, 2, 4 and 5, visor 16 includes a clamping structure 31 having a pair of clamping arms 30, 32, the upper ends of which are formed with confronting curved grooves 30a, 32a, respectively, which are shaped to match the like surface curvatures of the rail segments and gate members. These curved grooves are also referred to herein as contact portions. Taking a look particularly at FIG. 4, one can see that the upper reaches of arms 30, 32 are shaped in such a manner that, when clamped in place (as is illustrated) and when occupying what might be thought of as generally an upright plane, there is a space between the upper ends which accommodates sliding passage of the visor readily past the plates, such as plates 18a, 18b, which form parts of the bridging structures. Also, it should be understood that the space just mentioned between the upper ends of the clamping arms offers slidable clearance with respect to the structure that attaches mounting brackets 24 to the rail segments. In addition, one should note that these conventional clamping arms, adjacent their upper ends, curl sufficiently around the rail segment/gate member cross sections so that they project slightly above a horizontal plane which is tangent to the upper surfaces of these components.

Interposed these clamping arms is a conventional relaxing/tightening screw mechanism 34 for actuating the clamping arms. Joined to the underside of the clamping mechanism in the figures, through a mounting structure 36, is a conventional visor panel 38. Mounting structure 36 is constructed to afford a generally upright rotational axis for adjustment of the visor, and this axis is indicated generally by dash-dot line 37 in FIG. 4. Given this axis of adjustment, and the other obvious axis of adjustment which is axial relative to the particular component to which the clamping arms are attached, the visor is afforded a substantial degree of motion and adjustment.

Returning now to system 10, further considering the regions where the spaced confronting ends of the three rail segments so far described exist, these ends should be thought of as facing one another in "axial alignment". The importance of such an alignment will become immediately obvious in the discussion which shortly follows describing the structural and operating features of the gate structures. In addition, while a system has been disclosed herein with but three rail segments and two gate structures, those skilled in the art should recognize that a greater or lesser number of gate structures and rail segments, may be used if so desired.

Continuing, and focusing attention now especially on FIGS. 2-5, inclusive, gate structure 14 takes the form of an elongate member having an axial cross section which substantially matches the cross section characterizing the rail segments. As can be seen particularly in FIGS. 2 and 5, the opposite ends of gate member 14 are formed with downwardly facing recesses, or shoulders (shoulder regions), 14a, 14b which are intended to be seatable, as shown (see FIG. 2), on previously mentioned shoulders 12a, 12b, respectively, in the rail segments when the gate member is in what is referred to herein as a closed condition. In this condition, gate member 14 substantially completely spans and fills the space between the confronting ends of rail segments 12A, 12B. As will be explained, in this condition, the member, along with the rail segments which it spans, forms the previously mentioned, contiguous path-definer which enables free, unimpeded sliding adjustment of a visor, such as visor 16. Previously mentioned "axial alignment" of the rail segments' confronting ends cooperate in this respect.

Further considering the construction of gate member 14, formed in the outer upper ends of this member are slots 14c, 14d which freely receive plates 18a, 18b, respectively, thus permitting the gate member free vertical slidability on the confronting ends of these plates, while at the same time capturing the gate member against lateral escape, as for example in a direction normal to the plane of FIG. 2.

Gate structure 15 is constructed in a manner substantially the same as that described for gate structure 14.

Further included in system 10 according to the invention is biasing means which acts to urge each gate member normally into the closed condition illustrated for gate member 14 in FIG. 2. Addressing attention to FIGS. 2-5, inclusive, again, this biasing means includes, for each end of gate member 14, a riser, such as risers 26a, 26b slidably mounted on posts $18a_2$, $18b_2$, respectively, and interposed these risers and the underside of spanner bar 18c, and surrounding posts $18a_2$, $18b_2$, respectively, compression biasing springs 28a, 28b, respectively.

Obviously, under the influence of springs 28a, 28b, gate member 14 is urged normally to the closed condition in which it has been shown and described with reference to FIG. 2. When, however, it is desired to permit easy removal, or installation, of a visor, such as visor 16, vis-a-vis the rail structure, the appropriate gate structure is adjusted to an open condition to permit such activity. One such open condition is illustrated particularly in FIG. 5, wherein the right end of gate member 14 is shown raised against the action of biasing spring 28b and riser 26b to open a gap with the left end of rail segment 12B in FIG. 5, thus affording ready access for sliding removal or replacement of visor 16. Similar removal/replacement can occur, in a similar manner, adjacent the left end of gate member 14 in FIG. 5. Obvious chamfers which are formed in gate member 14 in the region of shoulders 14a, 14b accommodate rocking of the same to conditions, such as the condition shown in FIG. 5. An open condition may also be obtained by simultaneously raising both ends of the gate member, providing for sliding removal/replacement at either end.

Considering free slidability of a mounted visor in system 10, and focusing attention on such slidability past and beyond the gate structures, one should note (see particularly FIG. 2) that the risers, such as risers 26a, 26b, as viewed in this Figure, have curvilinear undersides. These undersides, in effect, offer cam surfaces which engage with the upper extremities of a visor's clamping arms, such as arms 30, 32, to enable camming away of the risers from the top surface of the gate member to allow ready passage of a visor.

The various features and advantages offered to a user by the structure of the present invention should now be quite apparent. To begin with, assembly/disassembly of a visor structure, as for example taking apart of a clamping mechanism in a visor, is not required in order to enable removal/reinstallation of a visor in the proposed system. All that is required is simple manipulation of a gate member in the structure to open up clearance for slidable extraction or reinsertion of the gate member's clamping mechanism.

With a gate member closed, a substantially continuous slidable travel way, referred to herein as a path-definer, exists for free slidable adjustment of a visor along the length of the system made up of the rail segments and the gate members. Nothing in the proposed system in any way appreciably interferes with normal multiple axial angulation of a visor to place it in the most appropriate condition for a user.

The proposed system is designed to be compatible with conventional visor structures, and accordingly does not require the purchase of any special visor mechanisms. Further, the system promotes easy retrofitting into a vehicle, such as an aircraft, in addition to offering a simple and viable option as a piece of original installed equipment.

Yet another consideration is that the system proposed by the invention is extremely simple in construction, and one which offers a high degree of reliability in performance.

Accordingly, while a preferred embodiment of the invention has been disclosed, it should be appreciated that variations and modifications may be made without departing from the scope of the invention as defined by the claims.

It is Claimed and Desired to Secure by Letters Patent:

1. For use in a vehicle sun visor system controlled manipulation of a sun visor in the system:
    rail structure including a pair of spaced elongate rail segments having operatively confronting segment ends; and
    elongate gate structure operatively associated with said segments, said gate structure being configurable in a closed condition wherein said gate structure extends in said space between said segments to provide, in cooperation with said segments, a substantially contiguous path-definer along which the visor is controllably manipulable, said gate structure being actuable to at least one open condition permitting removal of the visor by moving the same past one of said ends.

2. A sun visor system for use on a transportation device, said system comprising:
    a sun visor;
    rail structure including a pair of elongate rail segments having operatively confronting segment ends defining a space between said segments; and
    elongate gate structure operatively associated with said segments, said gate structure being configurable in a closed condition wherein said gate structure extends in said space between said segments to provide, in cooperation with said segments, a substantially contiguous path-definer along which said visor is controllably manipulable, said gate structure being actuable to at least one open condition permitting removal of said visor by moving the same past one of said ends.

3. The system of claim 2 wherein said gate structure is constructed for pivotal actuation.

4. The system of claim 2 wherein said gate structure includes an elongate unitary gate member having first and second gate ends, each of said gate ends being adjacent a corresponding one of said segment ends when said gate structure is in said closed condition, said gate member being pivotable about said first gate end to a first open configuration to permit removal of said visor by moving the same past one of said segment ends, said gate member also being pivotable about said second gate end to a second open configuration to permit removal of said visor by moving the same past the other of said segment ends.

5. The system of claims 2, 3 or 4 further comprising biasing means for urging said gate structure normally into said closed condition.

6. A sun visor system for use on a transportation device, said system comprising:
   a sun visor;
   rail structure including a pair of spaced axially aligned elongate rail segments having operatively confronting segment ends; and
   an elongate unitary gate member having first and second gate ends, said gate member being positionable in a closed condition wherein said member extends in axial alignment between said segments to provide, in cooperation with said segments, a substantially contiguous path-definer along which said visor is infinitely slidably positionable, said first and second gate ends each being independently movable from said closed condition adjacent a corresponding one of said segment ends to a position permitting detachment of said visor by sliding the same past said corresponding one of said segment ends.

7. The system of claim 6 further comprising biasing means for urging said gate member normally into said closed condition.

8. A sun visor system for use on a transportation device, said system comprising:
   a sun visor;
   an elongate gate member;
   rail structure including a pair of elongate rail segments having operatively confronting segment ends defining a space between said segments; and
   biasing means for urging said gate member normally into a closed condition in which the gate member extends in said space between said segments, the combination of said segments and said gate member providing a substantially contiguous path-definer along which said visor is infinitely positionable, said biasing means permitting said gate member to be moved into an open condition in which the visor is removable from either of said ends of said segments.

9. A sun visor system for use on a transportation device, said system comprising:
   rail structure including a plurality of spaced axially aligned elongate rail segments, adjacent ones of said segments terminating in operatively confronting segment ends, each of said segment ends having a shoulder region;
   an elongate gate member having first and second gate ends, each of said gate ends having a shoulder region;
   a bidirectionally movable sun visor having a contact portion capable of engaging said rail segments and said gate member; and
   biasing means for urging said gate member normally into a closed condition wherein each of said gate end's shoulder region engages a corresponding shoulder region in a segment end to provide a substantially contiguous path-definer along which said visor is infinitely slidably positionable, said biasing means permitting said gate member to be moved into an open condition to provide for the slidable removal of the visor by sliding of the same past one of said ends of said adjacent rail segments.

10. The system of claim 9 wherein at least one of said gate ends defines a slot therein and a corresponding one of said rail segments has an alignment member rigidly mounted thereon to align said gate member axially with said corresponding one of said rail segments through coaction with said slot.

11. The system of claim 9 wherein said biasing means includes a spring.

12. The system of claim 11 wherein said biasing means further includes a movable riser interposed said spring and said gate member, said riser being urged toward engagement with said gate member by said spring.

13. The system of claim 12 wherein said riser includes an edge inclined away from said gate member to facilitate sliding passage of said contact portion of said visor past said riser.

* * * * *